(12) United States Patent
Boyd

(10) Patent No.: US 7,770,541 B2
(45) Date of Patent: Aug. 10, 2010

(54) ANIMAL TRAINING DEVICE RESPONSIVE TO AN AUDIBLE SIGNAL

(75) Inventor: Randal D. Boyd, Knoxville, TN (US)

(73) Assignee: Radio Systems Corporation, Knoxville, TN (US)

(*) Notice: Subject to any disclaimer, the term of this patent is extended or adjusted under 35 U.S.C. 154(b) by 8 days.

(21) Appl. No.: 12/057,438

(22) Filed: Mar. 28, 2008

(65) Prior Publication Data

US 2009/0241853 A1    Oct. 1, 2009

(51) Int. Cl.
*A01K 15/02* (2006.01)
(52) U.S. Cl. .................................................. 119/719
(58) Field of Classification Search .............. 119/718, 119/719, 720
See application file for complete search history.

(56) References Cited

U.S. PATENT DOCUMENTS

| | | | | |
|---|---|---|---|---|
| 3,753,421 A | * | 8/1973 | Peck | 119/721 |
| 3,777,712 A | * | 12/1973 | Gardner et al. | 119/719 |
| 5,207,179 A | * | 5/1993 | Arthur et al. | 119/721 |
| 5,749,324 A | * | 5/1998 | Moore | 119/719 |
| 5,815,077 A | * | 9/1998 | Christiansen | 340/573.3 |
| 6,019,066 A | * | 2/2000 | Taylor | 119/720 |
| 6,487,992 B1 | | 12/2002 | Hollis | |
| 6,885,305 B2 | * | 4/2005 | Davis | 340/573.3 |
| 6,956,483 B2 | * | 10/2005 | Schmitt et al. | 340/573.3 |
| 7,017,524 B2 | * | 3/2006 | Gillis et al. | 119/719 |
| 7,089,720 B2 | * | 8/2006 | Kurt | 54/71 |
| 2004/0206310 A1 | | 10/2004 | Hutchins | |
| 2005/0257752 A1 | | 11/2005 | Langer | |
| 2007/0012260 A1 | * | 1/2007 | Boyd et al. | 119/720 |

* cited by examiner

*Primary Examiner*—Rob Swiatek
*Assistant Examiner*—Ebony Evans
(74) *Attorney, Agent, or Firm*—Pitts & Brittian, P.C.

(57) ABSTRACT

Described is an animal training device for delivering a response signal in response to receiving an audible signal. The animal training device is adapted to be carried by an animal and delivers the response signal, which includes a stimulus to the animal and an animal location indicator, in response to receiving the audible signal, which includes a voice command and other distinguishable sounds. The animal training device allows an animal handler to deliver a stimulus to the animal and generate a location indicator without using an additional device, such as a handheld transmitter.

2 Claims, 6 Drawing Sheets

ANIMAL TRAINING DEVICE RESPONSIVE TO AN AUDIBLE SIGNAL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a device that is adapted to be carried by an animal and that is responsive to an audible signal. More specifically, this invention pertains to a device for delivering a response signal in response to receiving an audible signal.

2. Description of the Related Art

Conventional animal training devices include a handheld transmitter carried by a trainer and a receiver unit carried by an animal, whereby the handheld transmitter is in wireless communication with the receiver unit. The handheld transmitter typically includes one or more buttons and transmits an electromagnetic signal in response to one of the buttons being pressed. More specifically, each button corresponds to a distinguishable electromagnetic signal such that when a given button is pressed, a respective distinguishable electromagnetic signal is transmitted. The receiver unit delivers one of a plurality of stimuli to the animal in response to receiving an electromagnetic signal transmitted by the handheld transmitter. More specifically, each stimulus delivered by the receiver unit corresponds to a specific distinguishable electromagnetic signal transmitted by the handheld transmitter such that when a specific button is pressed, a respective stimulus is delivered to the animal. The stimuli delivered by the receiver unit include both positive and negative stimuli such that a trainer can praise and/or correct the animal at the push of a button.

Conventional animal training devices are limited in that to deliver a stimulus to the animal, the trainer must use the handheld transmitter to transmit an electromagnetic signal to the receiver unit. This is a limitation because particular circumstances require praising or correcting the animal when the trainer does not have the handheld transmitter in his possession to do so. Additionally, some circumstances require the trainer to use his hands for tasks other than operating the handheld transmitter when the need to praise or correct the animal presents itself. For example, when a trainer is using the animal to herd cattle through a gate, operation of which requires both hands of the trainer, the trainer is unable to operate the handheld transmitter. Consequently, a device that delivers a stimulus to an animal and that does not require a handheld transmitter is desired.

BRIEF SUMMARY OF THE INVENTION

In accordance with the various features of the present invention there is provided an animal training device for delivering a response signal in response to receiving an audible signal. The animal training device includes a microphone, a memory module, a processing device, and a response signal delivery module. The processing device is in electrical communication with the microphone, the memory module, and the response signal delivery module. The microphone is adapted to receive the audible signal such that when the microphone receives the audible signal, the processing device receives a digital form of the audible signal. The processing device considers an activation signal, which is stored at the memory module, and determines whether the audible signal is substantially similar to the activation signal. When the processing device determines that the audible signal is substantially similar to the activation signal, the processing device activates the response signal delivery module such that the response signal delivery module delivers the response signal. The response signal delivery module can be a stimulus delivery module such that the response signal is a stimulus delivered to an animal. Alternatively, the response signal delivery module can be a location indicator delivery module such that the response signal is a location indicator.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
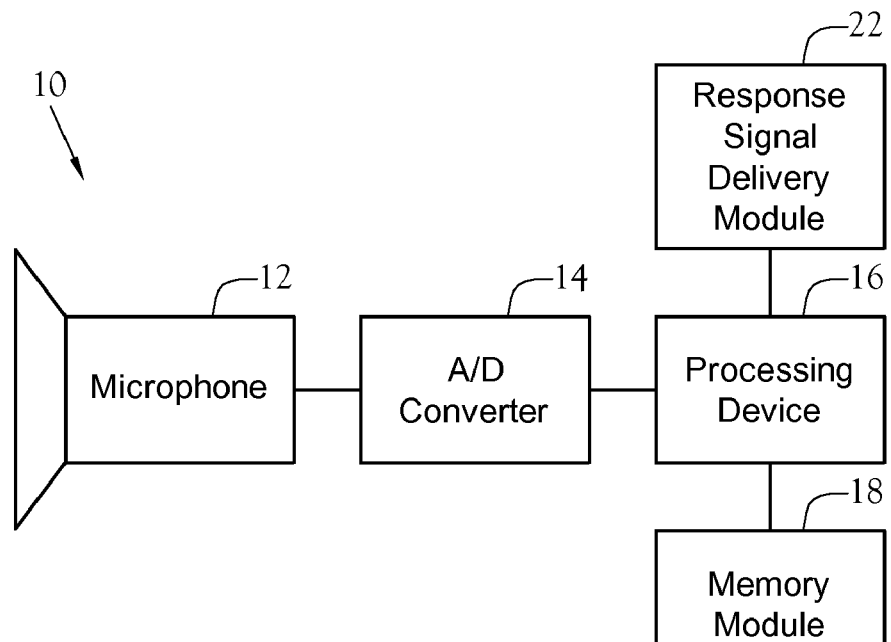
FIG. 1 is a block diagram of one embodiment of the animal training device in accordance with the various features of the present invention.

The present invention provides an animal training device for delivering a response signal in response to receiving an audible signal. The animal training device is adapted to be carried by an animal and delivers the response signal, which includes a stimulus to the animal and an animal location indicator, in response to receiving the audible signal, which includes a voice command and other distinguishable sounds. The animal training device allows an animal handler to deliver a stimulus to the animal and generate a location indicator without using a handheld transmitter. A block diagram of one embodiment of the animal training device constructed in accordance with the various features of the present invention is illustrated generally at 10 in FIG. 1.

The animal training device 10 is adapted to be carried by an animal. For example, one embodiment of the animal training device 10 is adapted to be mounted on a pet collar such that when the animal training device 10 is mounted to the pet collar and the pet collar is secured to the animal, the animal carries the animal training device 10. The animal training device 10 includes a microphone 12 that is responsive to an audible signal. The audible signal includes any distinguishable sound or series of sounds and co-occurring ambient noises. More specifically, the audible signal includes, but is not limited to, a voice command, a whistle, an alarm, and a percussive pattern generated by, for example, a hand clap. It should be noted that the audible signal can include a distinguishable sound other than the specific audible signals previously or subsequently discussed without departing from the scope or spirit of the present invention.

In the illustrated embodiment, the animal training device 10 includes an analog-to-digital (A/D) converter 14 in electrical communication with the microphone 12. The A/D converter 14 receives the audible signal from the microphone 12 and converts the audible signal to a digital format. The animal training device 10 also includes a processing device 16 and a memory module 18, the processing device 16 being in electrical communication with the A/D converter 14 and the memory module 18. The processing device 16 receives the audible signal from the A/D converter 14 and accesses the memory module 18. It should be noted that the processing device 16 can be adapted to receive the audible signal as it is outputted by the microphone 12 such that the A/D converter 14 is not required without departing from the scope or spirit of the present invention.

The memory module 18 stores an activation signal. The activation signal is a signal having audible properties. The activation signal can be a recorded signal or a digitally manufactured signal. For example, when the activation signal is a recorded signal, one embodiment of the animal training device 10 records an audible sound by way of the microphone 12 and stores the recorded sound at the memory module 18 as the activation signal. For example, a voice command spoken by the handler is recorded by the animal training device 10 and stored as the activation signal. As another example, a whistle or an alarm is recorded by the animal training device 10 and stored as the activation signal. It should be noted that the activation signal can be recorded by a device other than the animal training device 10 without departing from the scope or spirit of the present invention. It should also be noted that the activation signal can be programmed into the memory module 18, for example, by the manufacturer or user of the animal training device 10 without departing from the scope or spirit of the present invention.

The processing device 16 processes the audible signal with respect to the activation signal. More specifically, the processing device 16 compares the audible signal against the activation signal to determine whether the audible signal is substantially similar to the activation signal. In determining whether the audible signal is substantially similar to the activation signal, the processing device 16 considers whether at least one particular characteristic of the audible signal is substantially similar to the same particular characteristic of the activation signal. Whether the audible signal is substantially similar to the activation signal, as determined by the processing device 16, depends on the desired sophistication of the signal processing. For example, when the activation signal is a recorded voice command, the audible signal can be substantially similar to the activation signal when the audible signal includes the same spoken word or words as the activation signal. Alternatively, the audible signal can be substantially similar to the activation signal when the audible signal includes the same word or words as the activation signal and the audible signal is spoken by the same individual who recorded the activation signal. Similarly, when the activation signal is a sound other than a voice command, such as a whistle generated by the handler, the processing device 16 can determine whether the audible signal is substantially similar to the activation signal by considering, for example, the pitch, the change in pitch, or the duration of the whistle. It should be noted that the processing device 16 can determine that the audible signal is substantially similar to the activation signal based on criteria other than the discussed criteria without departing from the scope or spirit of the present invention.

When the processing device 16 determines that the audible signal is substantially similar to the activation signal, the processing device 16 activates a response signal delivery module 22, which is included by the animal training device 10 and is in electrical communication with the processing device 16. When activated, the response signal delivery module 22 delivers a response signal. In one embodiment, the response signal delivery module 22 is a stimulus delivery module that delivers a stimulus to the animal. The stimulus delivered by the response signal delivery module 22 includes any stimulus intended to motivate the animal, including a rewarding stimulus and a corrective stimulus. More specifically, the stimulus includes an audible stimulus, a visual stimulus, a vibration stimulus, an electrostatic stimulus, and a stimulus intended to impact the animal's olfactories. It should be noted that the response signal delivery module 22 can deliver a stimulus other than the specific previously and subsequently discussed stimuli without departing from the scope or spirit of the present invention.

One embodiment of the animal training device 10 includes more than one response signal delivery module 22. In this embodiment, each response signal delivery module 22 has a corresponding activation signal. Consequently, the processing device 16 compares the audible signal against each activation signal and determines whether the audible signal is substantially similar to any of the activation signals. For example, a first activation signal corresponds to a first response signal delivery module 22, and a second activation signal corresponds to a second response signal delivery module 22. When the processing device 16 determines that the audible signal is substantially similar to the first activation signal, the processing device 16 activates the first response signal delivery module 22. Similarly, when the processing device 16 determines that the audible signal is substantially similar to the second activation signal, the processing device 16 activates the second single response delivery module 22.

Figure 2:
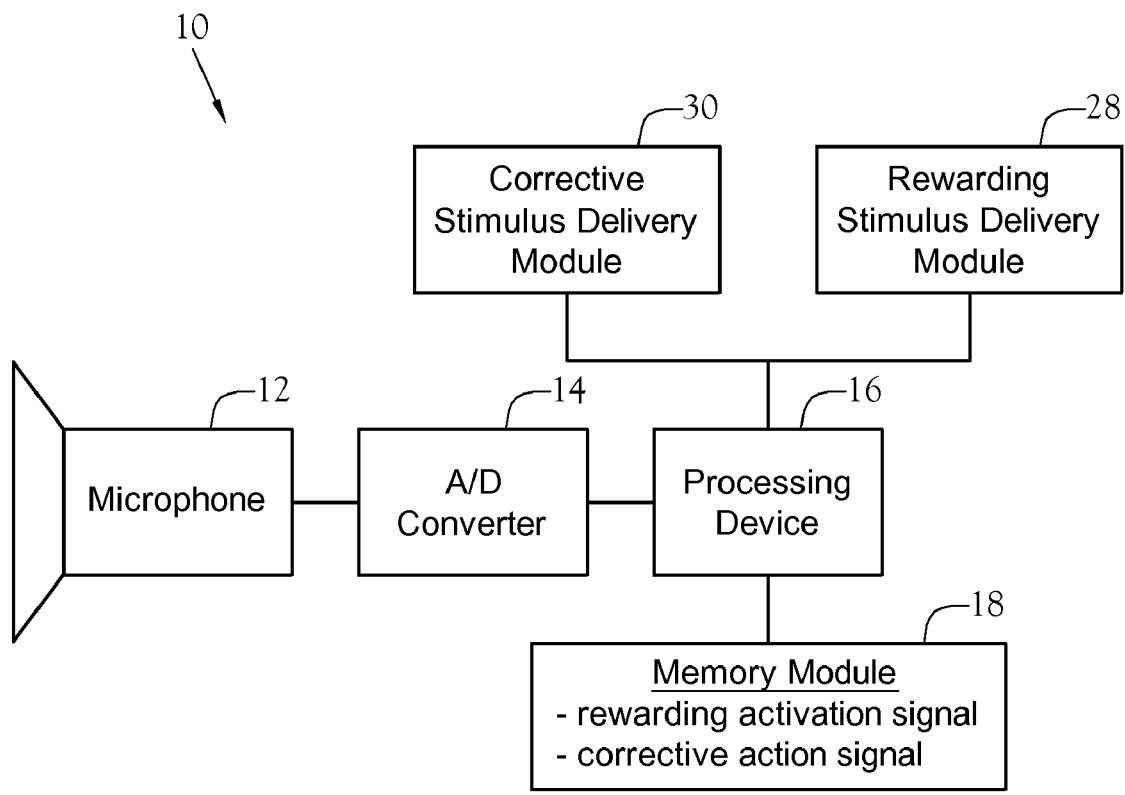
FIG. 2 is a block diagram of the animal training device of FIG. 1, whereby the stimulus delivery module includes a corrective stimulus delivery module and a rewarding stimulus delivery module.

FIG. 2 illustrates an alternate embodiment of the animal training device 10 having more than one response signal delivery module 22. In the illustrated embodiment, the activation signal includes a rewarding activation signal and a corrective activation signal, each being stored at the memory module 18. Accordingly, the response signal delivery module 22 includes a rewarding stimulus delivery module 28 and a corrective stimulus delivery module 30. In accordance with the above-discussion, the rewarding activation signal corresponds with the rewarding stimulus delivery module 28, and the corrective activation signal corresponds with the corrective stimulus delivery module 30. The rewarding stimulus delivery module 28 delivers a rewarding stimulus to the animal when the processing device 16 determines that the audible signal is substantially similar to the rewarding activation signal. The corrective stimulus delivery module 30 delivers a corrective stimulus to the animal when the processing device 16 determines that the audible signal is substantially similar to the corrective activation signal.

Figure 3:
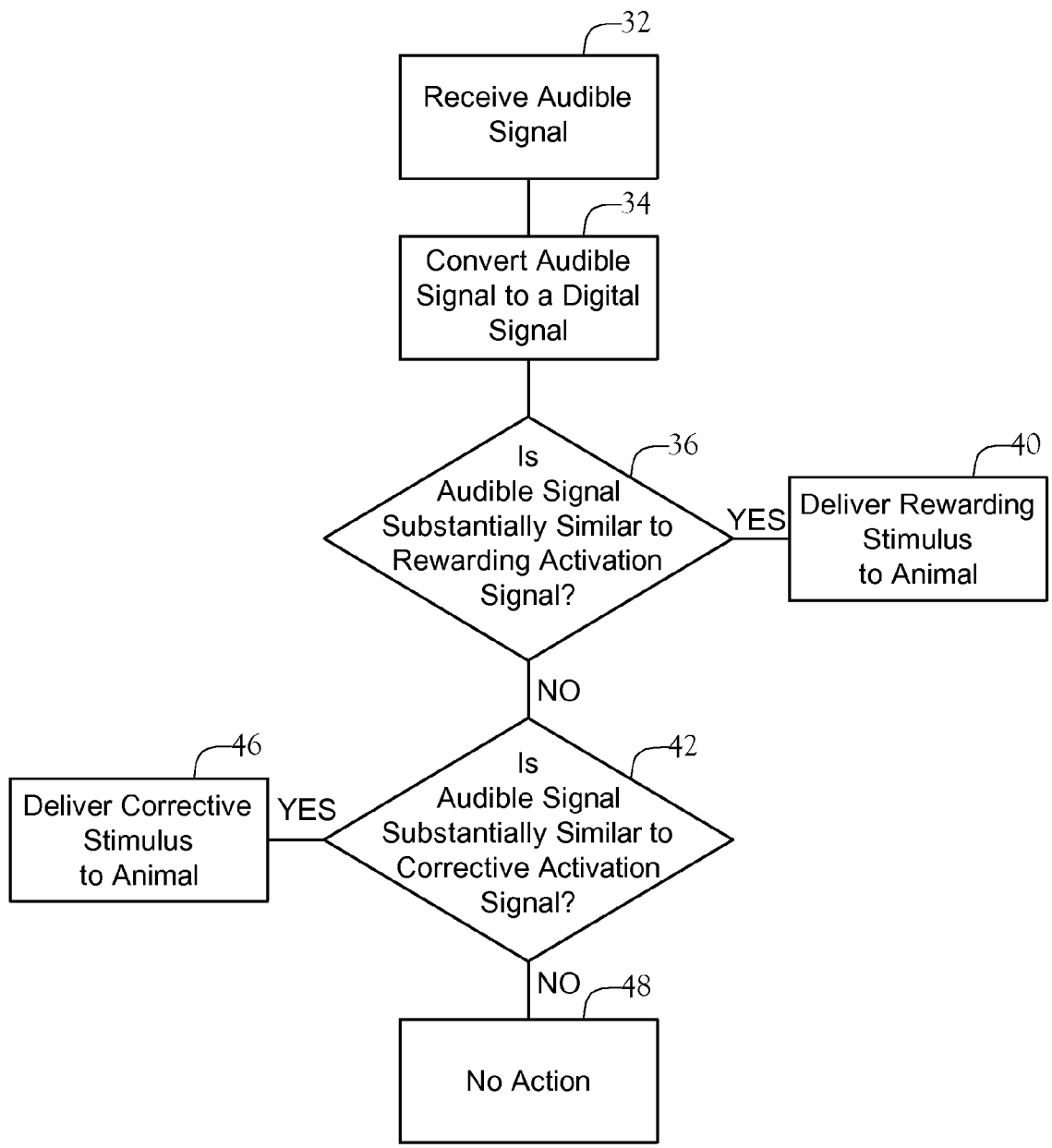
FIG. 3 is a flow diagram illustrating operative features of the animal training device of FIG. 2.

FIG. 3 is a flow diagram illustrating operative features of the animal training device 10 of FIG. 2. First, as illustrated at 32, the microphone 12 receives the audible signal. Next, as illustrated at 34, the A/D converter 14 converts the audible signal to a digital format, which is received by the processing device 16. Then, as illustrated at 36, the processing device 16 processes the audible signal and determines whether the audible signal is substantially similar to the rewarding activation signal, which, as previously discussed, is stored at the memory module 18. When the processing device 16 determines that the audible signal is substantially similar to the rewarding activation signal, the processing device 16 activates the rewarding stimulus delivery module 28 such that the rewarding stimulus delivery module 28 delivers the rewarding stimulus to the animal, as illustrated at 40. On the other hand, when the processing device 16 determines that the audible signal is not substantially similar to the rewarding activation signal, the processing device 16 processes the audible signal and determines whether the audible signal is substantially similar to the corrective activation signal, as illustrated at 42. When the processing device 16 determines that the audible signal is substantially similar to the corrective activation signal, the processing device 16 activates the corrective stimulus delivery module 30 such that the corrective stimulus delivery module 30 delivers the corrective stimulus to the animal, as illustrated at 46. On the other hand, when the processing device 16 determines that the received signal is not substantially similar to the corrective activation signal, the processing device 16 takes no further action, as illustrated at 48. It will be understood that the order in which the audible signal is compared to each of the rewarding activation signal and the corrective activation signal is not critical to the scope of the present invention.

Considering the animal training device 10 of FIG. 2 and the flow diagram of FIG. 3, the handler of the animal causes a rewarding stimulus and a corrective stimulus to be delivered to the animal without using a handheld transmitter. As an example, the rewarding activation signal may be the recorded verbal command "Good", and the corrective activation signal may be the recorded verbal command "No". When the handler wants to reward the animal for exhibited desired behavior, the handler speaks the voice command "Good". The animal training device 10 receives the spoken voice command, confirms that the voice command is substantially similar to the rewarding activation signal, and delivers the rewarding stimulus to the animal. Additionally, when the handler wants to correct the animal for exhibited undesired behavior, the handler speaks the voice command "No". The animal training device 10 receives the spoken voice command, confirms that the voice command is substantially similar to the corrective activation signal, and delivers the corrective stimulus to the animal.

Figure 4:
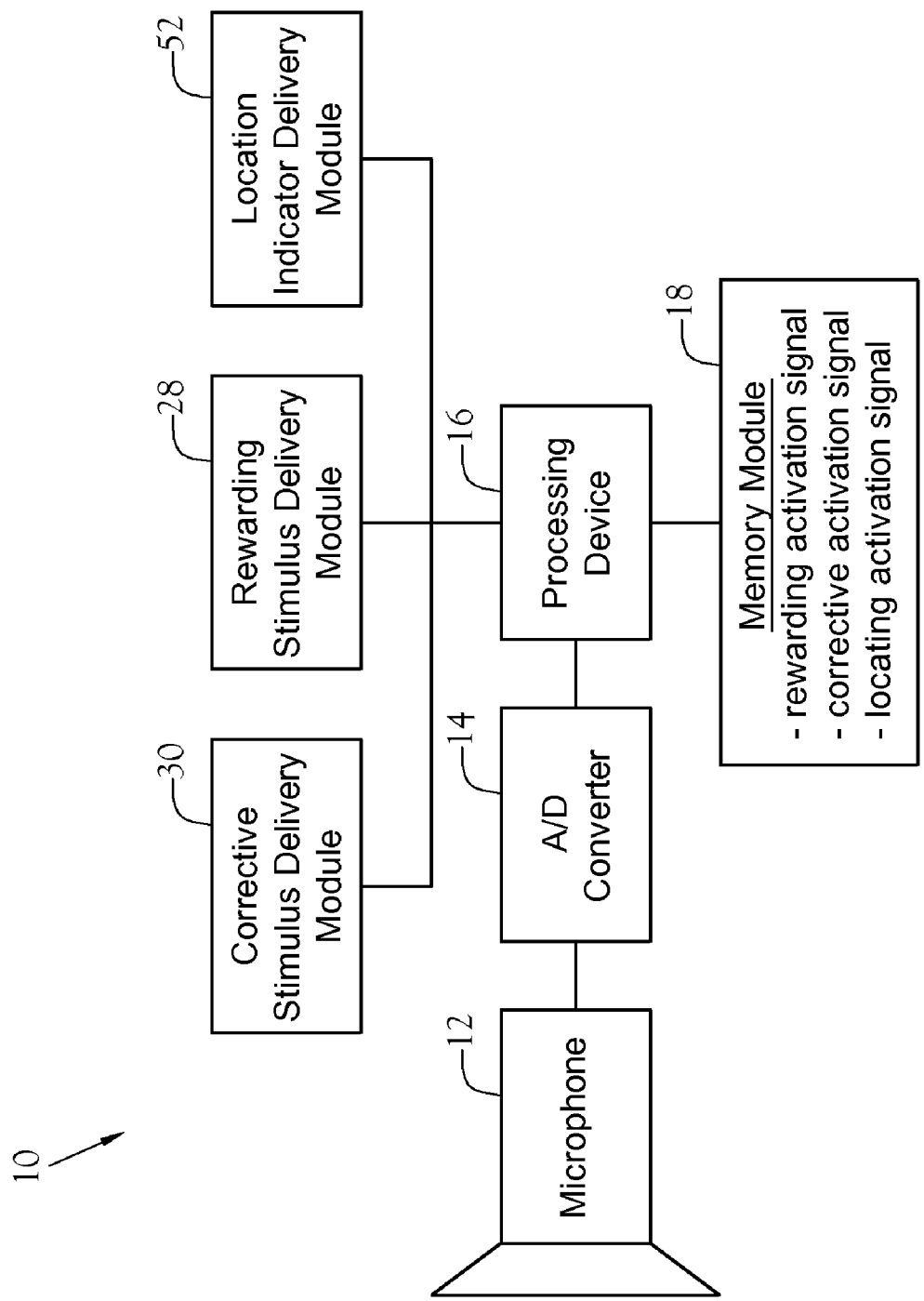
FIG. 4 is a block diagram of the animal training device of FIG. 1, whereby the response signal delivery module includes a corrective stimulus delivery module, a rewarding stimulus delivery module, and a location indicator delivery module.

FIG. 4 illustrates another alternate embodiment of the animal training device 10 in accordance with the various features of the present invention. In the illustrated embodiment, the activation signal includes the rewarding activation signal, the corrective activation signal, and a locating activation signal, whereby the rewarding activation signal, the corrective activation signal, and the locating activation signal are stored at the memory module 18. Accordingly, the response signal delivery module 22 includes the rewarding stimulus delivery module 28, the corrective stimulus delivery module 30, and a location indicator delivery module 52. In accordance with the above-discussion, the rewarding activation signal corresponds with the rewarding stimulus delivery module 28, the corrective activation signal corresponds with the corrective stimulus delivery module 30, and the locating activation signal corresponds with the location indicator delivery module 52. More specifically, the rewarding stimulus delivery module 28 delivers a rewarding stimulus to the animal when the processing device 16 determines that the audible signal is substantially similar to the rewarding activation signal. The corrective stimulus delivery module 30 delivers a corrective stimulus to the animal when the processing device 16 determines that the audible signal is substantially similar to the corrective activation signal. And the location indicator delivery module 52 delivers a location indicator, such as a beeping alarm, when the processing device 16 determines that the audible signal is substantially similar to the locating activation signal.

Figure 5:
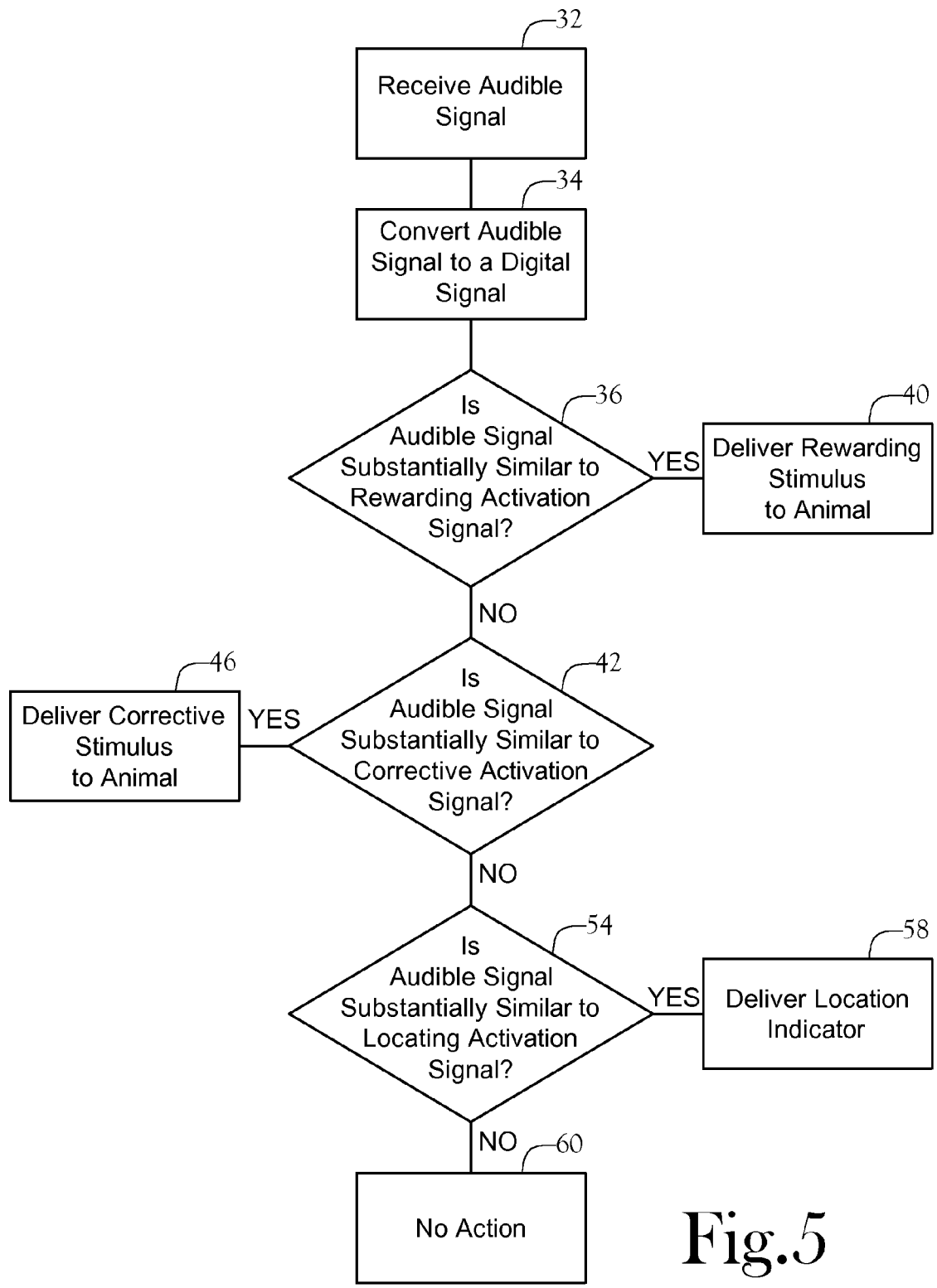
FIG. 5 is a flow diagram illustrating operative features of the animal training device of FIG. 4.

FIG. 5 is a flow diagram illustrating operative features of the animal training device 10 of FIG. 4. The operative features illustrated at 32-46 of FIG. 5 are discussed in detail in conjunction with FIG. 3. However, in FIG. 5, when the processing device 16 determines that the audible signal is not substantially similar to the corrective activation signal, the processing device 16 processes the audible signal and determines whether the audible signal is substantially similar to the locating activation signal, as illustrated at 54. When the processing device 16 determines that the audible signal is substantially similar to the locating activation signal, the processing device 16 activates the location indicator delivery module 52 such that the location indicator delivery module 52 delivers the location indicator, as illustrated at 58. On the other hand, when the processing device 16 determines that the audible signal is not substantially similar to the locating activation signal, the processing device 16 takes no further action, as illustrated at 60.

Considering the animal training device 10 of FIG. 4 and the flow diagram of FIG. 5, the handler causes a location indicator to be delivered such that the handler is made aware of the location of the animal without using a handheld transmitter. As an example, the locating activation signal may be a recorded whistle generated by the handler. When the handler wants to locate the animal, the handler whistles. The animal training device 10 receives the whistle, confirms that the whistle is substantially similar to the locating activation signal, and delivers the location indicator. As previously discussed, in one embodiment of the animal training device 10, the location indicator is a beeping alarm. Because the animal carries the animal training device 10, when the location indicator delivery module 52 emits a beeping alarm, the handler can hear the alarm and therefore find the location of the animal. In another embodiment of the animal training device 10, the locating activation signal may be the alarm generated by a smoke detector, and the location indicator is a flashing light. In this embodiment, when the smoke detector is activated, the animal training device 10 receives the alarm, confirms that the alarm is substantially similar to the locating activation signal, and delivers a flashing light such that, for example, a firefighter can locate the animal in a burning building.

Figure 6:
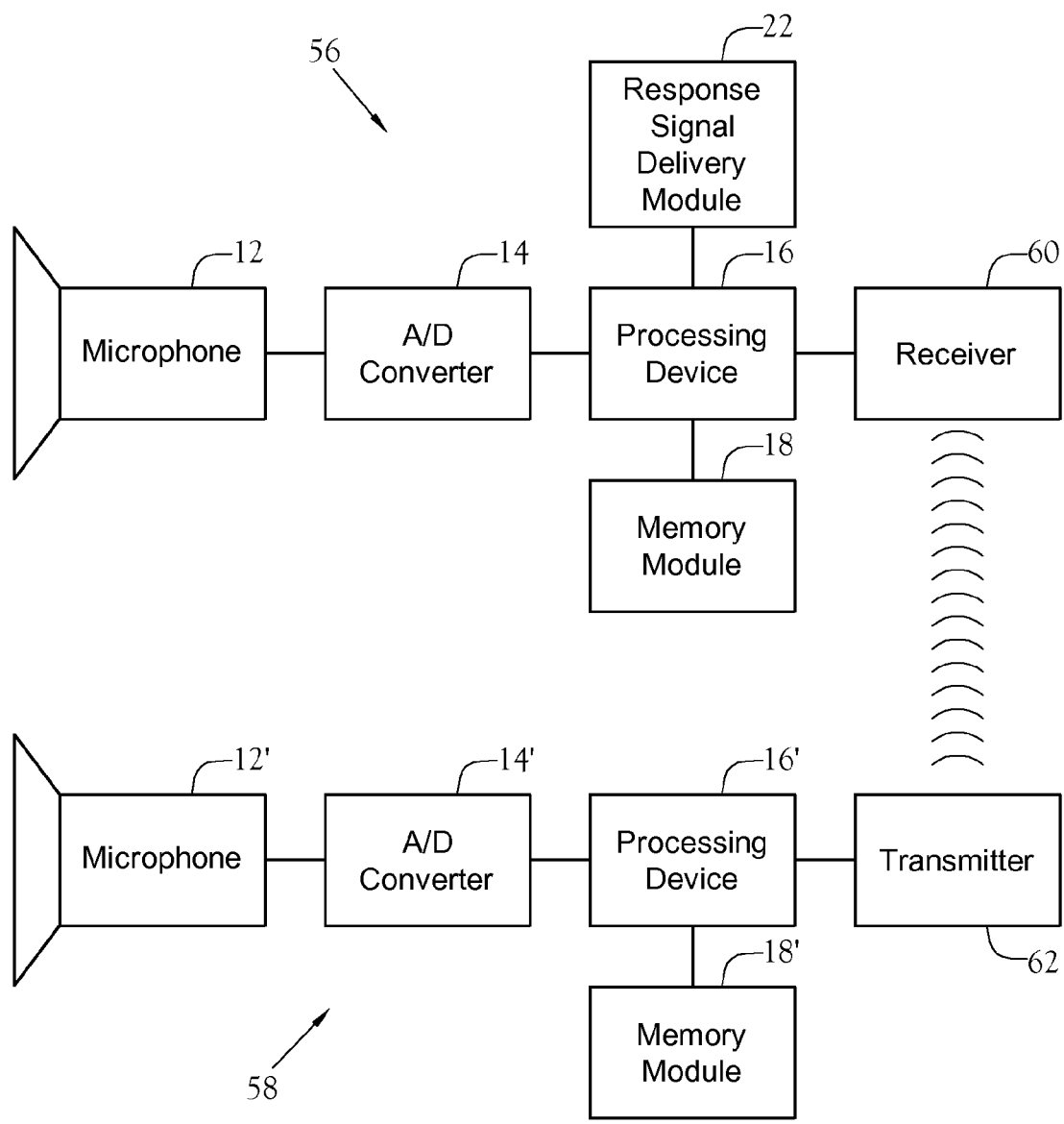
FIG. 6 is a block diagram illustrating an alternate embodiment of the animal training device including a rover unit and a handler unit.

FIG. 6 illustrates yet another alternate embodiment of the animal training device 10 in accordance with the various features of the present invention. The animal training device 10 of FIG. 6 includes a rover unit 56 and handler unit 58. The rover unit 56 is adapted to be carried by the animal in accordance with the above discussion, and the handler unit 58 is adapted to be carried by the handler in accordance with subsequent discussion. The rover unit 56 includes the microphone 12, the A/D converter 14, the processing device 16, the memory module 18, and the response signal delivery device 22 configured and operating as discussed in relation to FIG. 1. Additionally, the rover unit 56 includes a receiver 60 in electrical communication with the processing device 16 and in wireless communication with the handler unit 58. The handler unit 58 includes a second microphone 12', a second A/D converter 14', a second processing device 16', and a second memory module 18' configured and operating as discussed in relation to FIG. 1. The handler unit 58 also includes a transmitter 62 in electrical communication with the second processing device 16' and in wireless communication with the receiver 60.

In accordance with the above discussion, the second A/D converter 14' receives the audible signal from the second microphone 12' and converts the audible signal to a digital format. The second processing device 16' receives the audible signal from the second A/D converter 14' and accesses the second memory module 18'. The second processing device 16' processes the audible signal with respect to the activation signal. When the second processing device 16' determines that the audible signal is substantially similar to the activation signal, the second processing device 16' activates the transmitter 62. When activated, the transmitter 62 transmits a wireless signal. The receiver 60 is adapted to receive the wireless signal. When the receiver 60 receives the wireless signal, the processing device 16 activates the response signal delivery module 22 in accordance with above discussion.

Figure 7:
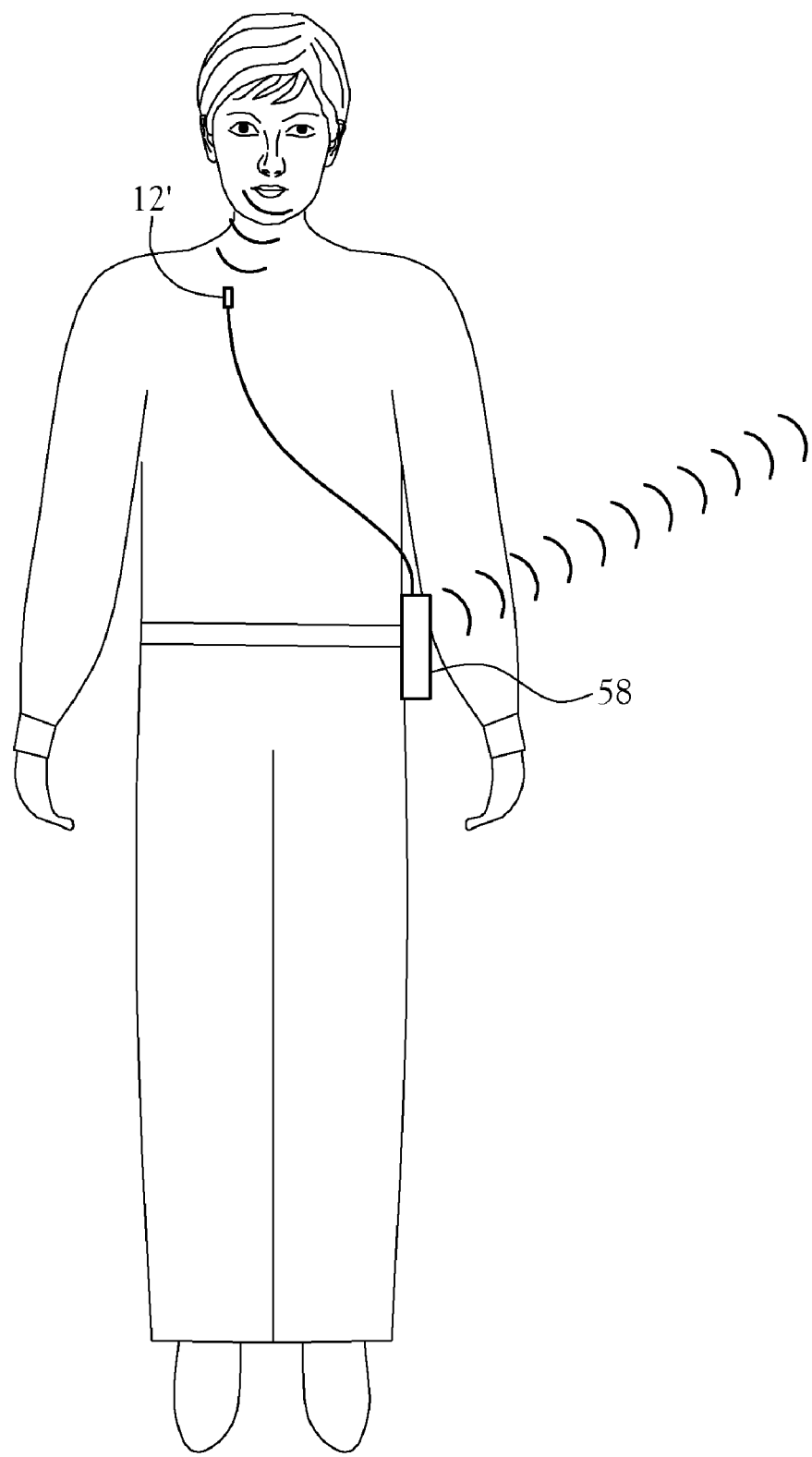
FIG. 7 illustrates one embodiment of the handler unit of FIG. 6.

Considering the alternate embodiment of FIG. 6, the animal training device 10 enables the handler to deliver a stimulus to the animal and/or generate the location indicator when a substantial geographical distance is between the animal and the handler. Additionally, the handler is able to do this without using a handheld transmitter. More specifically, the handler carries the handler unit 58 in a manner that does not require the use of the handler's hands. Additionally, the handler carries the handler unit 58 such that the second microphone 12' is positioned to receive the audible signal. For example, as illustrated at FIG. 7, in one embodiment, the handler unit 58 is secured to the handler's belt and the second microphone 12' is secured to the handler's shirt proximate to the handler's mouth. When the handler speaks the audible signal, the second microphone 12' responds to the signal such that the transmitter 62 transmits the wireless signal. The wireless signal is received by the receiver 60 such that the response signal delivery module 22 delivers the response signal.

From the foregoing description, those skilled in the art will recognize that an animal training device for delivering a response signal offering advantages over the prior art has been provided. The animal training device is adapted to be carried by the animal and delivers the response signal, which includes a stimulus to the animal and an animal location indicator, in response to receiving the audible signal, which includes a voice command and other distinguishable sounds. The animal training device allows an animal handler to deliver a stimulus to the animal and generate a location indicator without using an additional device, such as a handheld transmitter.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An animal training device, said animal training device comprising:
   a rover unit adapted to be carried by an animal, said rover unit comprising:
      a microphone adapted to receive an audible signal;
      a memory adapted to store at least one activation signal, the activation signal being a voice command;
      a processing device in electrical communication with said microphone and said memory, said processing device receives the audible signal from said microphone, said processing device receives the at least one activation signal from said memory, said processing device determines whether the audible signal is substantially similar to one of the at least one activation signal;
      a receiver in electrical communication with said processing device, said receiver adapted to receive a wireless signal; and
      a response signal delivery module in electrical communication with said processing device, said response signal delivery module delivers a response signal when said processing device determines that the audible signal is substantially similar to one of the at least one activation signal, said response signal delivery module delivers a response signal when said receiver receives the wireless signal; and
   a handler unit adapted to be carried by a handler, said handler unit comprising:
      a second microphone adapted to receive the audible signal;
      a second memory adapted to store the at least one activation signal;
      a second processing device in electrical communication with said second microphone and said second memory, said second processing device receives the audible signal from said second microphone, said second processing device receives the at least one activation signal from said second memory, said second processing device determines whether the audible signal is substantially similar to one of the at least one activation signal; and
      a transmitter in electrical communication with said second processing device, said transmitter transmits the wireless signal when said second processing device determines that the audible signal is substantially similar to one of the at least one activation signal.

2. An animal training device, said animal training device comprising:
   a handler unit adapted to be carried by a handler, said handler unit comprising:
      a microphone adapted to receive an audible signal;
      a memory adapted to store at least one activation signal, the activation signal being a voice command;
      a processing device in electrical communication with said microphone and said memory, said processing device receives the audible signal from said microphone, said processing device receives the at least one activation signal from said memory, said processing device determines whether the audible signal is substantially similar to one of the at least one activation signal; and
      a transmitter in electrical communication with said processing device, said transmitter transmits a wireless signal when said processing device determines that the audible signal is substantially similar to one of the at least one activation signal; and
   a rover unit adapted to be carried by an animal, said rover unit comprising:
      a receiver adapted to receive the wireless signal; and
   a response signal delivery module in electrical communication with said receiver, said response signal delivery module delivers a response signal when said receiver receives the wireless signal.

* * * * *